United States Patent
Jin et al.

(10) Patent No.: US 10,522,863 B2
(45) Date of Patent: Dec. 31, 2019

(54) ELECTROLYTE SOLUTION FOR REDOX FLOW BATTERY CONTAINING ORGANIC ACTIVE MATERIAL AND REDOX FLOW BATTERY USING THE SAME

(71) Applicant: Korea Institute of Energy Research, Daejeon (KR)

(72) Inventors: Chang-soo Jin, Sejong (KR); Sun-hwa Yeon, Sejong (KR); Myung-seok Jeon, Daejeon (KR); Kyoung-hee Shiin, Daejeon (KR); Bum-suk Lee, Daejeon (KR); Se-Kook Park, Daejeon (KR); Cheon Beom Park, Daejeon (KR); Jaeyoung So, Jeollanam-do (KR)

(73) Assignee: Korea Institute of Energy Research, Daejeon (KR)

(*) Notice: Subject to any disclaimer, the term of this patent is extended or adjusted under 35 U.S.C. 154(b) by 155 days.

(21) Appl. No.: 15/546,454

(22) PCT Filed: Sep. 6, 2016

(86) PCT No.: PCT/KR2016/009966
§ 371 (c)(1),
(2) Date: Jul. 26, 2017

(87) PCT Pub. No.: WO2018/043781
PCT Pub. Date: Mar. 8, 2018

(65) Prior Publication Data
US 2018/0277876 A1    Sep. 27, 2018

(30) Foreign Application Priority Data

Aug. 31, 2016 (KR) .................. 10-2016-0111270

(51) Int. Cl.
*H01M 8/18* (2006.01)
*H01M 8/023* (2016.01)
*H01M 8/0221* (2016.01)
*H01M 8/0239* (2016.01)

(52) U.S. Cl.
CPC ........... *H01M 8/188* (2013.01); *H01M 8/023* (2013.01); *H01M 8/0221* (2013.01); *H01M 8/0239* (2013.01); *H01M 2300/0011* (2013.01); *Y02E 60/528* (2013.01)

(58) Field of Classification Search
CPC .. H01M 8/188; H01M 8/0239; H01M 8/0221; H01M 8/023; H01M 2300/0011; Y02E 60/528
See application file for complete search history.

(56) References Cited

U.S. PATENT DOCUMENTS

| | | | |
|---|---|---|---|
| 2014/0030572 A1 | 1/2014 | Esswein et al. | |
| 2014/0370405 A1 | 12/2014 | Zhang et al. | |
| 2015/0236543 A1 | 8/2015 | Brushett et al. | |
| 2016/0308233 A1 | 10/2016 | Liu et al. | |

FOREIGN PATENT DOCUMENTS

| | | | |
|---|---|---|---|
| JP | 2008-117720 | * | 5/2008 |
| KR | 10-2014-0016298 A | | 2/2014 |
| KR | 10-2015-0046074 A | | 4/2015 |
| KR | 10-2016-0008089 A | | 1/2016 |

OTHER PUBLICATIONS

Liu et al., "A Total Organic Aqueous Redox Flow Battery Employing a Low Cost and Sustainable Methyl Viologen Anolyte and 4-HO-TEMPO Catholyte" Adv. Energy Mater. 2016, 6, 1501449.
International Search Report issued for PCT/KR2016/009966, dated Apr. 28, 2017.
Written Opinion of the International Searching Authority for PCT/KR2016/009966, dated Apr. 28, 2017.

* cited by examiner

*Primary Examiner* — Laura Weiner
(74) *Attorney, Agent, or Firm* — Westman, Champlin & Koehler, P.A.; Amanda M. Prose

(57) ABSTRACT

This invention relates to an electrolyte solution for a redox flow battery containing an organic active material, in which an organic compound useful as a single active material for a cathode and an anode is dissolved in a water-soluble solvent, and to a redox flow battery using the same. The electrolyte solution of the invention is an aqueous electrolyte solution obtained by dissolving an active material in an aqueous solvent, and is thus very stable due to the low risk of fire or explosion. Furthermore, the organic compound is applied as a single active material to the cathode and the anode, and thus, when the capacity of the battery is decreased due to the permeation of the active material through the separator, the battery capacity can be restored through rebalancing.

10 Claims, 16 Drawing Sheets

ELECTROLYTE SOLUTION FOR REDOX FLOW BATTERY CONTAINING ORGANIC ACTIVE MATERIAL AND REDOX FLOW BATTERY USING THE SAME

CROSS-REFERENCE TO RELATED APPLICATION

This application is a Section 371 National Stage Application of International Application No. PCT/KR2016/009966, filed Sep. 6, 2016, which claims priority to and benefits of KR Patent Application Serial No. 10-2016-0111270, filed with the Korean Intellectual Property Office on Aug. 31, 2016, the entire contents of which are incorporated herein by reference.

TECHNICAL FIELD

The present invention relates to an electrolyte solution for a redox flow battery containing an organic active material and a redox flow battery using the same. More particularly, the present invention relates to an electrolyte solution for a redox flow battery, in which an organic compound, useful as a single active material for a cathode and an anode, is dissolved in a water-soluble solvent, and to a redox flow battery using the same.

BACKGROUND ART

As global energy consumption increases, the amount of fossil fuels that are used as an energy source is gradually increasing. The use of fossil fuels causes climate change and environmental pollution, which have come to the fore as global problems. In order to solve these problems, attempts have been made to efficiently utilize electric power using renewable energy and energy storage systems.

Here, renewable energy, excluding energy based on coal, petroleum, nuclear energy and natural gas, refers to solar energy, biomass, wind power, small hydro power, fuel cells, coal liquefaction, gasification, marine energy, waste energy and others, and also indicates liquid fuel made out of byproducts of geothermal heat, hydrogen and coal, but is substantially an energy source able to replace petroleum. Various kinds of renewable energy are advantageous because no environmental pollution occurs and energy development is possible, but suffer from poor quality of energy due to variation in output depending on the geographical conditions and the natural environment. With the goal of solving such problems, an energy storage system that is capable of storing the remaining power and then supplying it flexibly when it is needed is emerging as the most suitable means, and in particular, a large-capacity long-term storage system is receiving attention.

Among a variety of energy storage systems, a redox flow battery is a secondary battery that employs oxidation and reduction of a redox couple or an active material dissolved in an electrolyte solution, unlike existing secondary batteries, in which electric energy is stored in an electrode containing an active material. A redox flow battery is configured such that a stack responsible for output and an electrolyte solution unit responsible for capacity are separately disposed, whereby the capacity and output may be freely designed. Only the oxidation-reduction reaction occurs through electron transfer at the electrodes in the redox flow battery, unlike other batteries, and thus there is no structural change of the electrode itself, and the electrode and the active material are separated from each other, whereby side reactions do not take place between these two materials, thus realizing high stability and a long lifetime compared to other kinds of secondary batteries. The electrolyte solution, which is one of key materials of the redox flow battery, is used in a manner in which active materials having different oxidation states are dissolved in a water-soluble or water-insoluble solvent. Here, various type of redox flow battery is formed depending on the kind of active material, and aqueous and non-aqueous electrolytes are provided depending on the kind of solvent. The electrolyte solution containing the active material has to have high reactivity with the electrode and reversibility, and also has to have a wide potential window and high solubility in order to increase energy density. The electromotive force of the redox flow battery is determined by the difference in standard electrode potential $E^°$ of the redox couple that constitutes a cathode electrolyte solution and an anode electrolyte solution, and examples of main aqueous redox couples developed to date include Fe/Cr, V/V, V/Br, Zn/Br, Zn/Ce, etc.

Meanwhile, development of a redox flow battery for space engineering using a Fe/Cr-based active material began in NASA (National Aeronautics and Space Administration), USA, in 1974. Initially used as the active material of the redox flow battery, Fe/Cr is problematic in terms of permeation of the active material through the separator and corrosion with the electrolyte, and thus the use thereof is limited.

Since then, many researchers have studied redox couples that have excellent stability and enable reversible electrochemical reactions with the electrodes. In 1980, a vanadium redox flow battery was developed by Maria Skyllas-Kazacos et al. of Australia. Vanadium, having various oxidations states, may be utilized as a single material for both the cathode and the anode. When vanadium is used as a single active material, even in the case that the battery capacity is decreased due to permeation of the vanadium active material through the separator, the battery capacity can be restored through rebalancing. However, the water-soluble vanadium active material suffers from low voltage and solubility and thus low energy density. In order to increase the energy density, when the concentration of the vanadium active material is increased, vanadium is precipitated on the anode V (II, III) at a low temperature of 0° C. or less, and vanadium pentoxide ($V_2O_5$) is precipitated on the cathode at an operating temperature of 40° C. or higher. In the case where precipitates are generated in the flow battery system, flow of the electrolyte solution is interrupted, and thus the inner pressure of the stack is increased, causing leakage, and the battery capacity is decreased due to the vanadium precipitate. Furthermore, with regard to vanadium, which is used as the active material of the flow battery, China possesses 40% of the world's reserves and thus large price fluctuations occur in response to changes in export volume, and moreover, patent technology regarding a vanadium active material and a flow battery using the same is held in foreign countries, and the use thereof is thus restricted.

[Citation List] Korean Patent Application Publication No. 10-2014-0016298

DISCLOSURE

Technical Problem

Accordingly, the present invention is intended to provide an electrolyte solution for a redox flow battery containing an organic active material, having high solubility and a wide potential window, and a redox flow battery using the same.

Technical Solution

Therefore, the present invention provides an electrolyte solution for a redox flow battery, comprising: a supporting electrolyte, an aqueous solvent, and an organic active material, wherein the organic active material includes at least one selected from the group consisting of alkyl viologen dihalide, 4,4-bipyridine, pyrazine, and quinoxaline.

The organic active material may be used as a single active material for a cathode and an anode.

The alkyl group of alkyl viologen dihalide may be selected from the group consisting of ethyl, methyl, propyl, butyl, heptyl, and diheptyl, but is not limited thereto.

The alkyl viologen dihalide may be alkyl viologen diiodide or alkyl viologen diperchlorate, and is preferably ethyl viologen diiodide or ethyl viologen diperchlorate.

The organic active material may be present at a concentration of 0.005 M to 0.3 M and preferably 0.01 M in the electrolyte solution.

The supporting electrolyte may be selected from the group consisting of $H_2SO_4$, $Li_2SO_4$, $Na_2SO_4$, $K_2SO_4$ and LiCl, and may be present at a concentration of 0.5 M to 3 M and preferably 1 M in the electrolyte solution.

The aqueous solvent may be water, a hydrophilic solvent, or a mixture of water and a hydrophilic solvent. Here, the hydrophilic solvent may include at least one selected from the group consisting of methanol, ethanol, methyl alcohol, isopropyl alcohol, ethylene glycol, and diethylene glycol.

In addition, the present invention provides a redox flow battery, comprising: a cathode cell comprising a cathode and a cathode electrolyte solution; an anode cell comprising an anode and an anode electrolyte solution; and a separator disposed between the cathode cell and the anode cell, wherein the cathode electrolyte solution and the anode electrolyte solution comprise a supporting electrolyte, an aqueous solvent and an organic active material, and the organic active material is selected from the group consisting of alkyl viologen dihalide, 4,4-bipyridine, pyrazine, and quinoxaline.

The separator may be an anion exchange membrane or a porous membrane.

A detailed description of the electrolyte solution is as above.

Advantageous Effects

According to the present invention, an electrolyte solution is an aqueous electrolyte solution obtained by dissolving an active material in an aqueous solvent, and is thus very stable by virtue of the low risk of fire or explosion. Also, an organic compound is applied as a single active material to a cathode and an anode, and thus, even when the capacity of a battery is decreased due to permeation of the active material through a separator, the battery capacity can be restored through rebalancing. Furthermore, the cost of the active material can be decreased compared to conventional flow batteries (all vanadium, Zn/Br), and problems with existing vanadium active materials such as the generation of precipitates can be overcome.

DESCRIPTION OF REFERENCE NUMERALS IN THE DRAWINGS

| | |
|---|---|
| 110: end plate | 120: carbon electrode |
| 130: separator | 140: flow frame |
| 150: graphite plate | 160: electrode current collector |

Node for Invention

Hereinafter, a detailed description will be given of embodiments of the present invention. The purposes, features, and advantages of the present invention will be easily understood through the following examples. The present invention is not limited to these examples, but may be embodied in other forms. These examples are provided such that the spirit of the present invention may be sufficiently transferred to those skilled in the art to which the present invention belongs. Therefore, the following examples are not to be construed as limiting the present invention.

Example: Preparation of Electrolyte Solution for Redox Flow Battery Containing Organic Active Material An electrolyte solution containing an organic active material according to the present invention was prepared by adding an active material and a supporting electrolyte to an aqueous solvent. Here, the kind and concentration of organic active material, supporting electrolyte and solvent that are used are shown in Table 1 below. Through cyclic voltammetry and charge/discharge testing, the electrochemical characteristics of the prepared electrolyte solution were analyzed.

TABLE 1

Kind and concentration of active material, supporting electrolyte and solvent used for preparation of electrolyte solution for redox flow battery

| Active material | | Supporting Eletrolyte | | |
|---|---|---|---|---|
| Kind | Conc. | Kind | Conc. | Solvent |
| Ethyl Viologen diiodide | 0.01M | $H_2SO_4$ | 1M | Water |
| Ethyl Viologen diperchlorate | 0.01M | $Li_2SO4$ | 1M | Water |
| 4,4-Bipyridine | 0.01M | $Na_2SO_4$ | 1M | Water |
| pyrazine | 0.01M | $K_2SO_4$ | 1M | Water |
| Quinoxaline | 0.01M | LiCl | 1M | Water |

Test Example 1: Evaluation of Redox Reaction Through Cyclic Voltammetry

In order to analyze the electrochemical characteristics of the prepared electrolyte solution, cyclic voltammetry (CV) was performed. Cyclic voltammetry, which is a commonly useful electrochemical measurement method, is performed in a manner in which the electrode potential of a working electrode is scanned in a triangular waveform at a predetermined rate to thus obtain a current-potential curve. The method in which the current flowing when a potential changes over time is recorded as a potential-current curve is called a potential sweep method, and the case where the potential is repeatedly applied is referred to as cyclic voltammetry. This is used to qualitatively analyze electrode surface reactions, including the potential at which the reaction occurs, the rate of the reaction, the reactivity of the reaction product, etc., and is useful in electrochemical fields.

Figure 1:
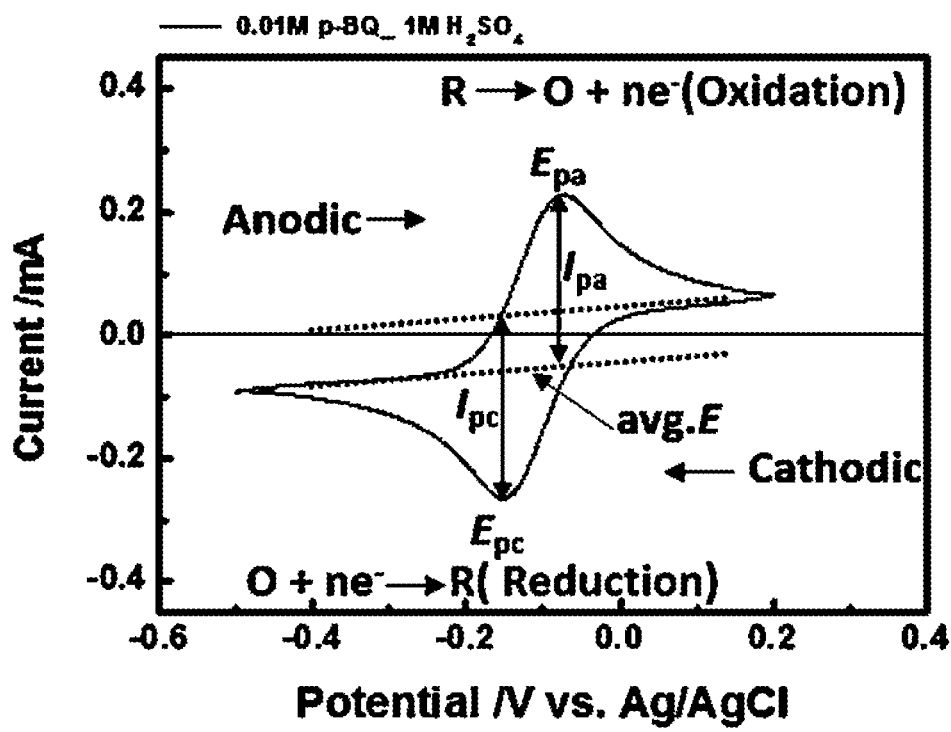
FIG. 1 schematically shows a cyclic voltammogram (top) and a three-electrode system (bottom)
Figure 1:
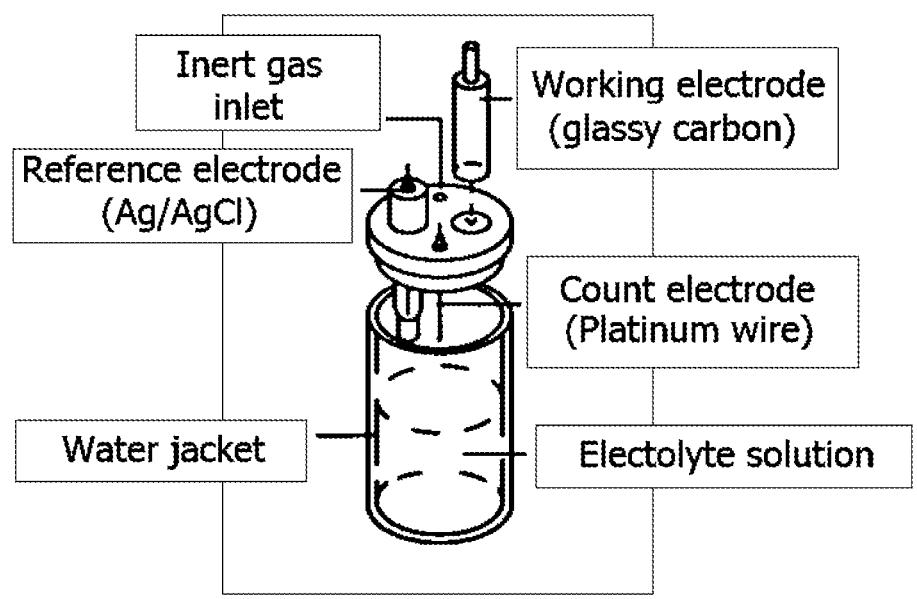

In cyclic voltammetry, $E_{pa}$ designates an anodic peak potential, $E_{pc}$ designates a cathodic peak potential, and $E_p/2((E_{pa}+E_{pc})/2)$ designates an average value of both peak potentials. Also, $I_{pa}$ designates an anodic peak current, and $I_{pc}$ designates a cathodic peak current (top drawing of FIG. 1). For a reversible reaction, the magnitude of anodic or cathodic current or peak current is proportional to the square of the scan rate. As the absolute value of $E_p/2$ increases, high potential of the active material used for the redox flow battery is favorable. Furthermore, as the anodic/cathodic peak current ratio ($I_{pa}/I_{pc}$) approaches 1, a reversible reaction occurs.

CV used in the present invention was performed using a three-electrode system. The electrode at which the electrode reaction of a measurement target occurs is a working electrode. In the present test, a glassy carbon electrode having a diameter of 3 mm was used, and a reference electrode was composed of Ag/AgCl and a counter electrode was formed of a platinum wire (bottom drawing of FIG. 1).

1-1: CV of Ethyl Viologen Diiodide

In order to evaluate the redox reaction of ethyl viologen diiodide and the standard electrode potential E°, individual electrolyte solutions were prepared using 0.01 M ethyl viologen diiodide and supporting electrolytes including the supporting electrolytes of Table 1, NaCl and KCl. Here, only $K_2SO_4$ was added at 0.5 M, and the remaining supporting electrolytes were added at 1 M. Individual electrodes were positioned in the prepared electrolyte solution and then connected to a potentiostat/galvanostat, and CV testing was carried out. The scan rate, indicative of the potential sweep rate, was set to 100 mV/s.

Figure 2:
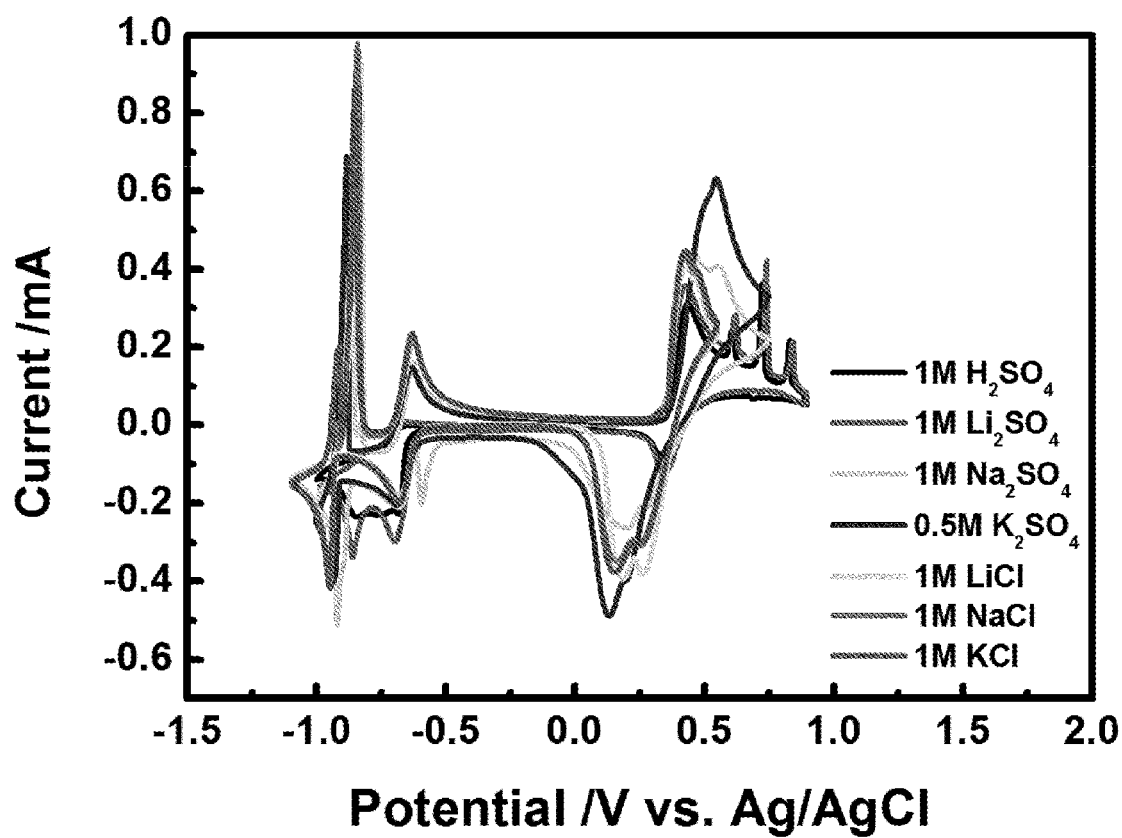
FIG. 2 shows cyclic voltammograms of ethyl viologen diiodide in an aqueous solvent using various supporting electrolytes.

Based on the test results, the anodic and cathodic peaks appeared at the negative and positive potentials of all electrolyte solutions (FIG. 2). Thereby, the electrolyte solution of the present invention can be found to show a reversible redox reaction. The anodic/cathodic peak potential difference and the averaged peak potential are given in Table 2 below.

TABLE 2

| Supporting Electrolyte | $\Delta E_p1$ | $\Delta E_p2$ | $\Delta E_p3$ | $\Delta E_p1/2\_(1)$ | $\Delta E_p1/2\_(2)$ | $\Delta E_p1/2\_(3)$ |
|---|---|---|---|---|---|---|
| H2SO4 | 0.12 | 0.09 | | −0.71 | 0.39 | |
| Li2SO4 | 0.03 | 0.05 | 0.08 | −0.84 | −0.67 | 0.38 |
| Na2SO4 | 0.07 | 0.05 | 0.28 | −0.89 | −0.65 | 0.33 |
| K2SO4 | 0.05 | 0.07 | 0.42 | −0.90 | −0.66 | 0.34 |
| LiCl | 0.12 | 0.06 | 0.20 | −0.89 | −0.65 | 0.32 |
| NaCl | 0.11 | 0.06 | 0.27 | −0.90 | −0.65 | 0.29 |
| KCl | 0.09 | 0.04 | 0.27 | −0.90 | −0.66 | 0.29 |

As for the reaction mechanism, ethyl viologen is a compound including 4,4'-bipyridinium, with three oxidation states of $EVD^{2+}$, $EVD^+$, and $EVD^0$, and the redox reaction takes place at the negative potential. Here, the redox reaction of $EVD^{2+} \leftrightarrow EVD^+$ occurs at $E_1$, and the redox reaction of $EVD^+ \leftrightarrow EVD^0$ occurs at $E_2$.

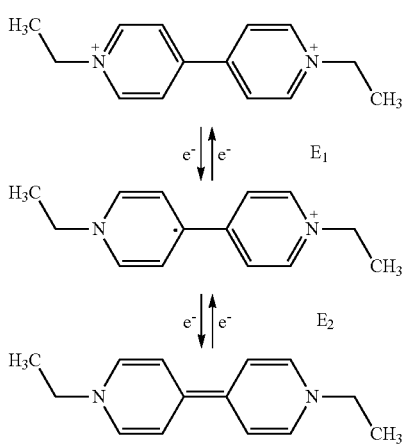

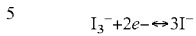

Also, for the diiodide reaction of the viologen diiodide compound, the redox reaction occurs at the positive potential, and the reaction scheme thereof is represented below.

$I_3^- + 2e^- \leftrightarrow 3I^-$ 1-2: CV of Ethyl Viologen Diperchlorate

In order to evaluate the redox reaction of ethyl viologen diperchlorate and the standard electrode potential $E°$, electrolyte solutions were prepared and tested in the same manner as in Test Example 1-1.

Figure 3:
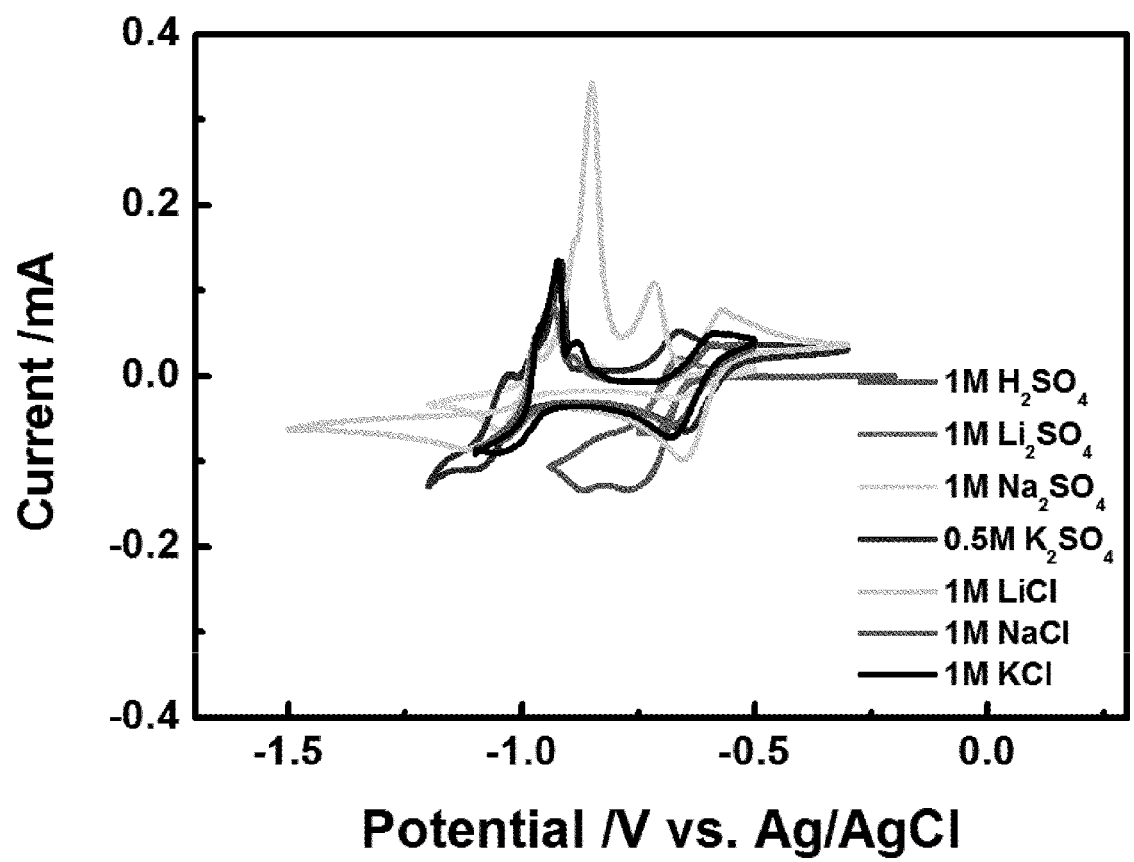
FIG. 3 shows cyclic voltammograms of ethyl viologen diperchlorate in an aqueous solvent using various supporting electrolytes.

Based on the test results, ethyl viologen diperchlorate caused a reversible redox reaction at the negative potential. The results are plotted in FIG. 3. The anodic/cathodic peak potential difference and the averaged peak potential are given in Table 3 below.

TABLE 3

| Supporting Electrolyte | $\Delta E_p 1$ | $\Delta E_p 2$ | $\Delta E_p 3$ | $\Delta E_p 1/2\_(1)$ | $\Delta E_p 1/2\_(2)$ | $\Delta E_p 1/2\_(3)$ |
|---|---|---|---|---|---|---|
| H2SO4 | 0.05 | | | -0.69 | | 0.05 |
| Li2SO4 | 0.11 | | | -0.99 | | 0.11 |
| Na2SO4 | 0.18 | -0.02 | | -1.00 | -0.66 | 0.18 |
| K2SO4 | 0.27 | | -1.22 | -0.99 | 0.04 | 0.27 |
| LiCl | | 0.09 | | | -0.63 | |
| NaCl | 0.13 | 0.09 | | -0.99 | -0.63 | 0.13 |
| KCl | 0.05 | | | -0.69 | | 0.05 |

1-3: CV of 4,4-bipyridine

In order to evaluate the redox reaction of 4,4-bipyridine and the standard electrode potential $E°$, electrolyte solutions were prepared and tested in the same manner as in Test Example 1-1.

Figure 4:
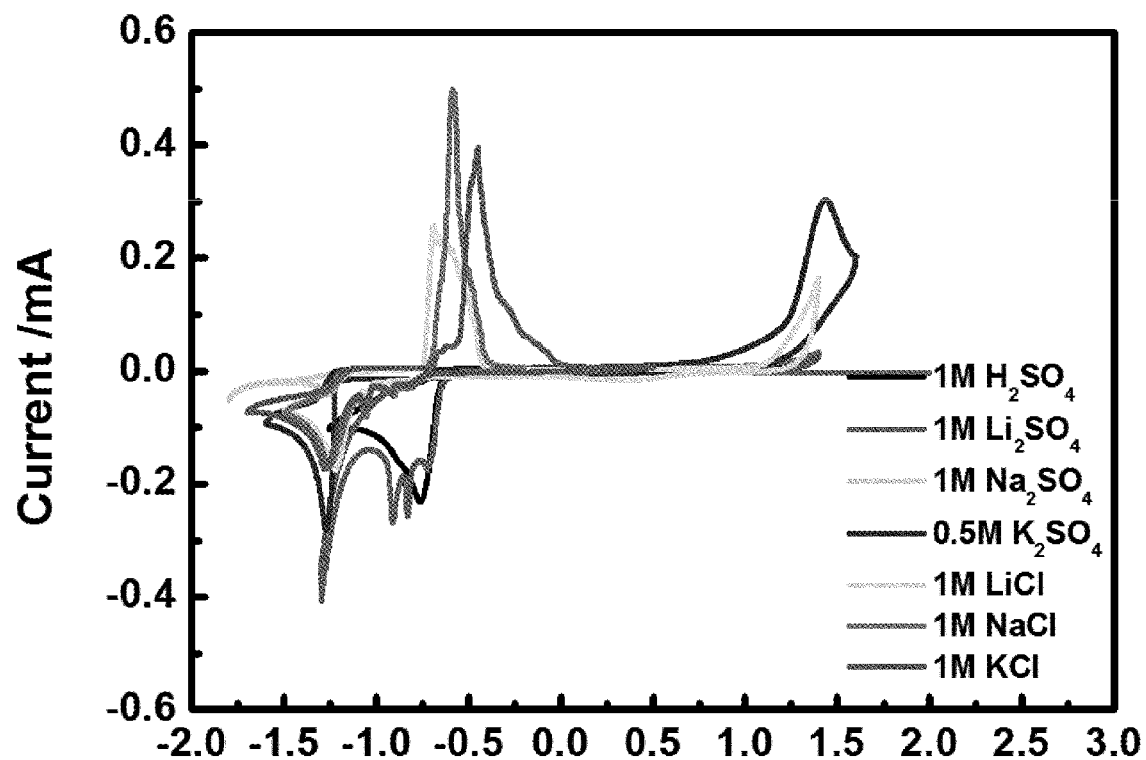
FIG. 4 shows cyclic voltammograms of 4,4-bipyridine in an aqueous solvent using various supporting electrolytes.

Based on the test results, 4,4-bipyridine caused a reversible redox reaction at the negative potential. The results are plotted in FIG. 4. The anodic/cathodic peak potential difference and the averaged peak potential are given in Table 4 below.

TABLE 4

| Supporting Electrolyte | $\Delta E_p 1$ | $\Delta E_p 2$ | $\Delta E_p 3$ | $\Delta E_p 1/2\_(1)$ | $\Delta E_p 1/2\_(2)$ | $\Delta E_p 1/2\_(3)$ |
|---|---|---|---|---|---|---|
| H2SO4 | | | | | | |
| Li2SO4 | | | | | | |
| Na2SO4 | | | | | | |
| K2SO4 | 2.71 | | | 0.07 | | |
| LiCl | 0.53 | | | -0.96 | | |
| NaCl | 0.40 | | | -1.05 | | |
| KCl | 0.83 | | | -0.87 | | |

1-4: CV of Pyrazine

In order to evaluate the redox reaction of pyrazine and the standard electrode potential $E°$, electrolyte solutions were prepared and tested in the same manner as in Test Example 1-1.

Figure 5:
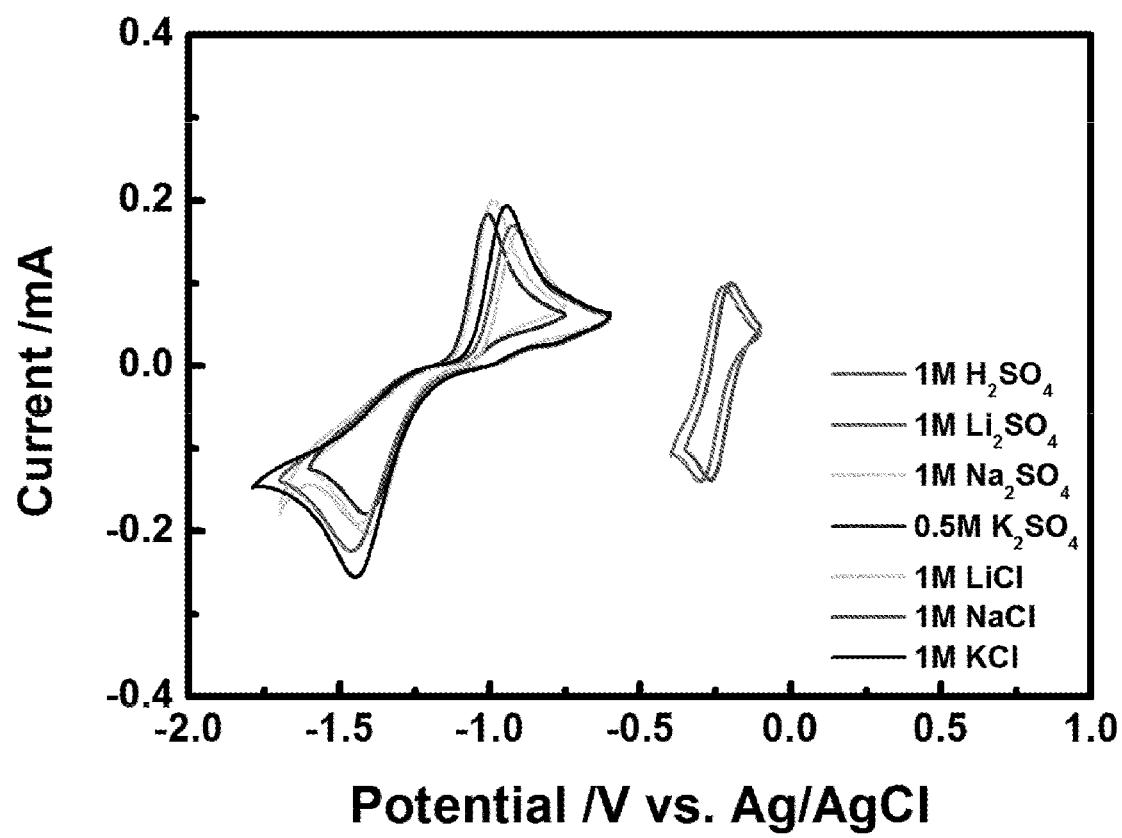
FIG. 5 shows cyclic voltammograms of pyrazine in an aqueous solvent using various supporting electrolytes.

Based on the test results, pyrazine caused a reversible redox reaction at the negative potential. The results are plotted in FIG. 5. The anodic/cathodic peak potential difference and the averaged peak potential are given in Table below.

TABLE 5

| Supporting Electrolyte | $\Delta E_p 1$ | $\Delta E_p 2$ | $\Delta E_p 3$ | $\Delta E_p 1/2\_(1)$ | $\Delta E_p 1/2\_(2)$ | $\Delta E_p 1/2\_(3)$ |
|---|---|---|---|---|---|---|
| H2SO4 | 0.06 | | | −0.23 | | |
| Li2SO4 | 0.08 | | | −0.26 | | |
| Na2SO4 | 0.41 | | | −1.20 | | |
| K2SO4 | 0.41 | | | −1.21 | | |
| LiCl | 0.53 | | | −1.17 | | |
| NaCl | 0.54 | | | −1.20 | | |
| KCl | 0.50 | | | −1.20 | | |

1-5: CV of Quinoxaline

In order to evaluate the redox reaction of quinoxaline and the standard electrode potential E°, electrolyte solutions were prepared and tested in the same manner as in Test Example 1-1.

Figure 6:
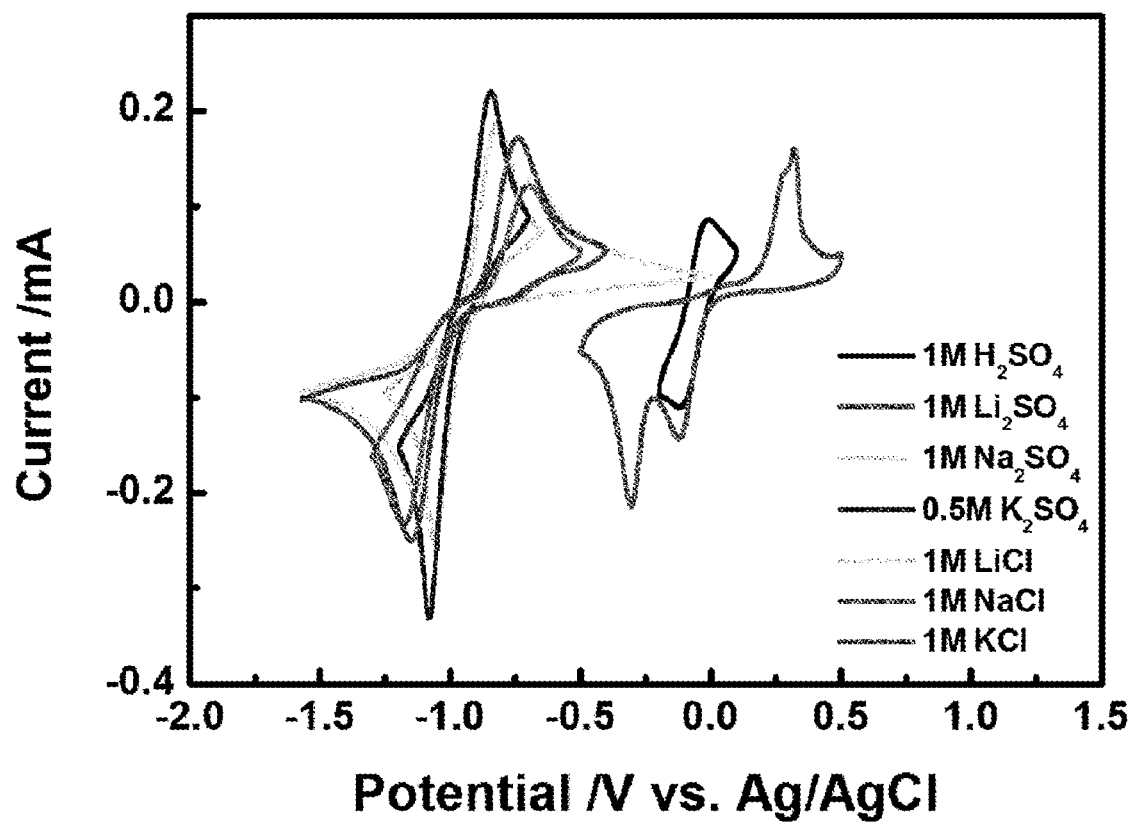
FIG. 6 shows cyclic voltammograms of quinoxaline in an aqueous solvent using various supporting electrolytes.

Based on the test results, quinoxaline caused the reversible redox reaction at the negative potential in the electrolyte solutions using the remaining supporting electrolytes other than $H_2SO_4$ and $Li_2SO_4$. The results are plotted in FIG. 6. The anodic/cathodic peak potential difference and the averaged peak potential are given in Table 6 below.

TABLE 6

| Supporting Electrolyte | $\Delta E_p 1$ | $\Delta E_p 2$ | $\Delta E_p 3$ | $\Delta E_p 1/2\_(1)$ | $\Delta E_p 1/2\_(2)$ | $\Delta E_p 1/2\_(3)$ |
|---|---|---|---|---|---|---|
| H2SO4 | 0.10 | | | −0.07 | | |
| Li2SO4 | 0.44 | | | 0.10 | | |
| Na2SO4 | 0.24 | | | −0.94 | | |
| K2SO4 | 0.24 | | | −0.97 | | |
| LiCl | 0.44 | | | −0.91 | | |
| NaCl | 0.48 | | | −0.94 | | |
| KCl | 0.41 | | | −0.94 | | |

Figure 7:
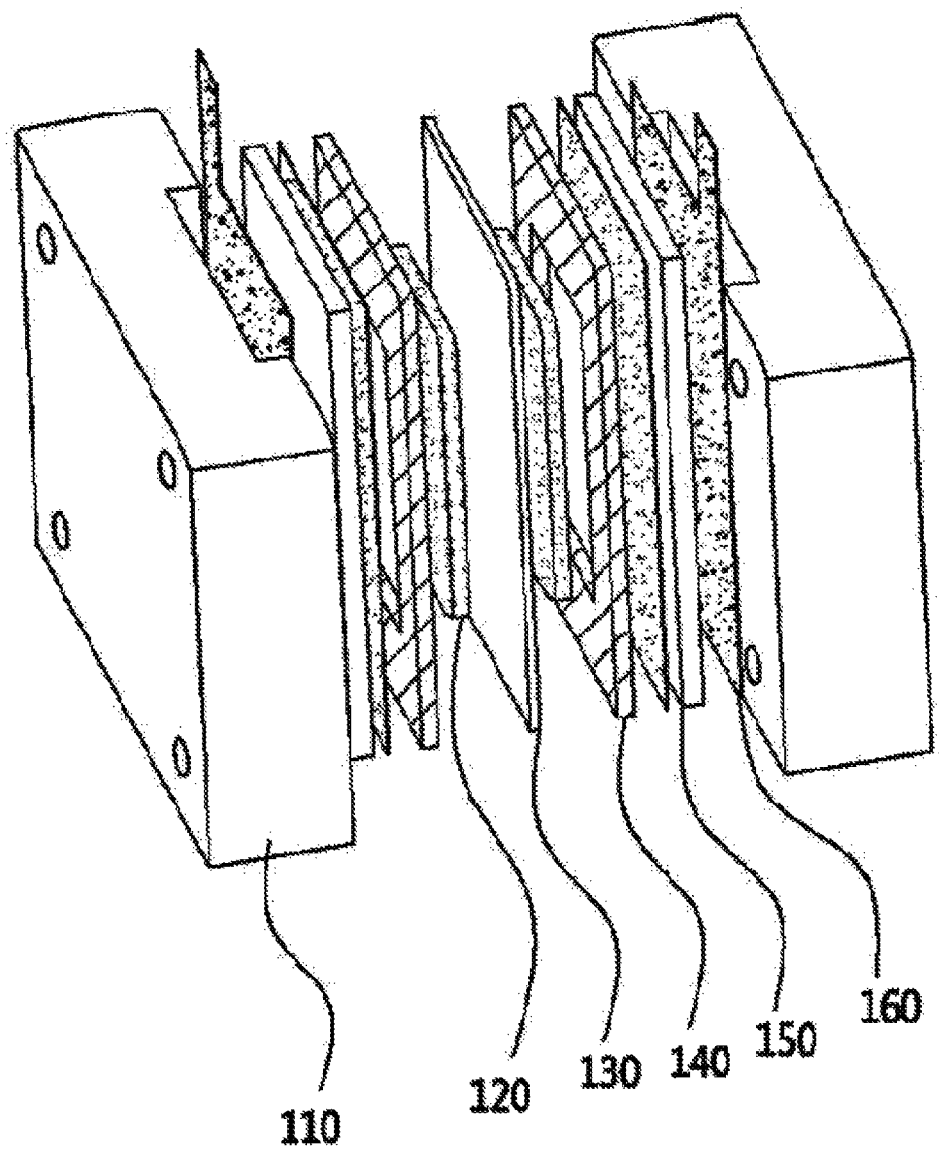
FIG. 7 schematically shows the configuration of a redox flow battery.
Figure 8A:
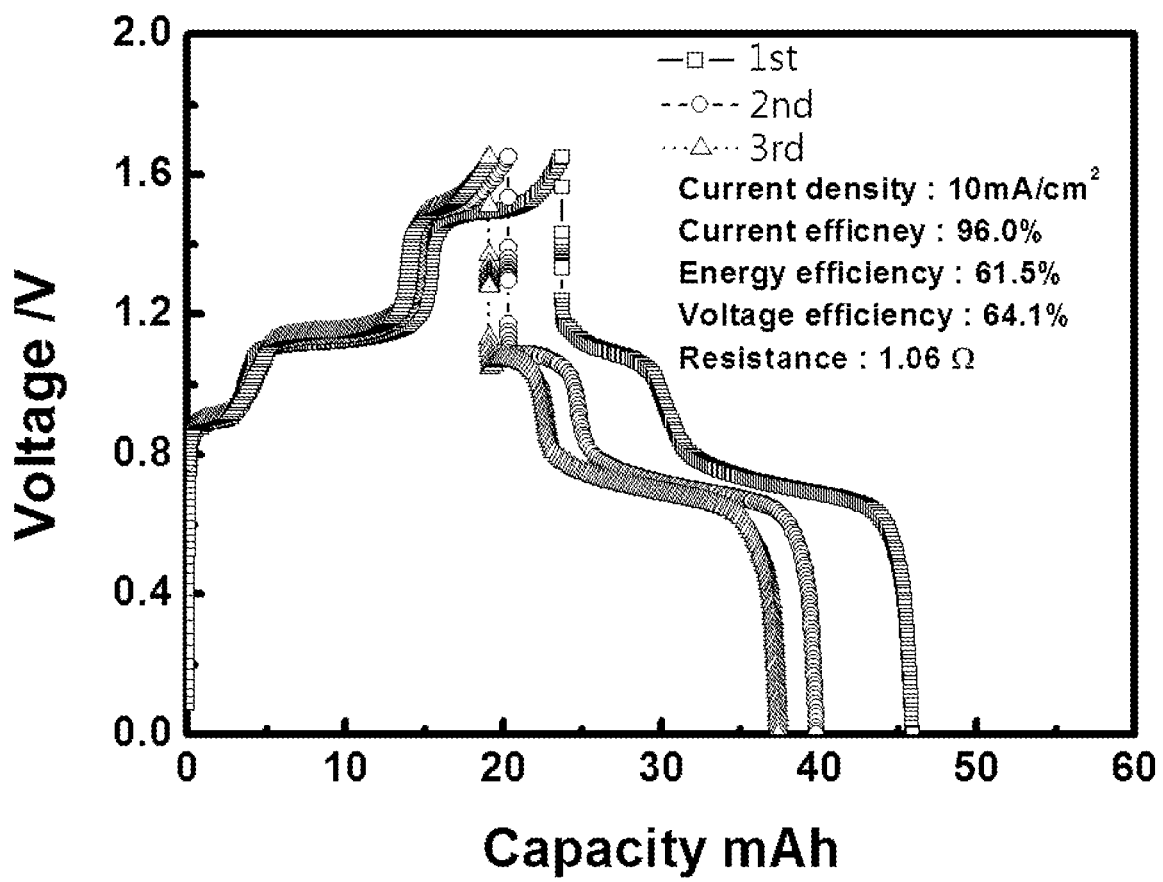
FIG. 8A shows the results of charge/discharge testing of an ethyl viologen diiodide redox flow battery using an FAP-450 separator, including potential changes, current efficiency, energy efficiency and potential efficiency over time at a current density of 10 $mA/cm^2$.
Figure 8B:
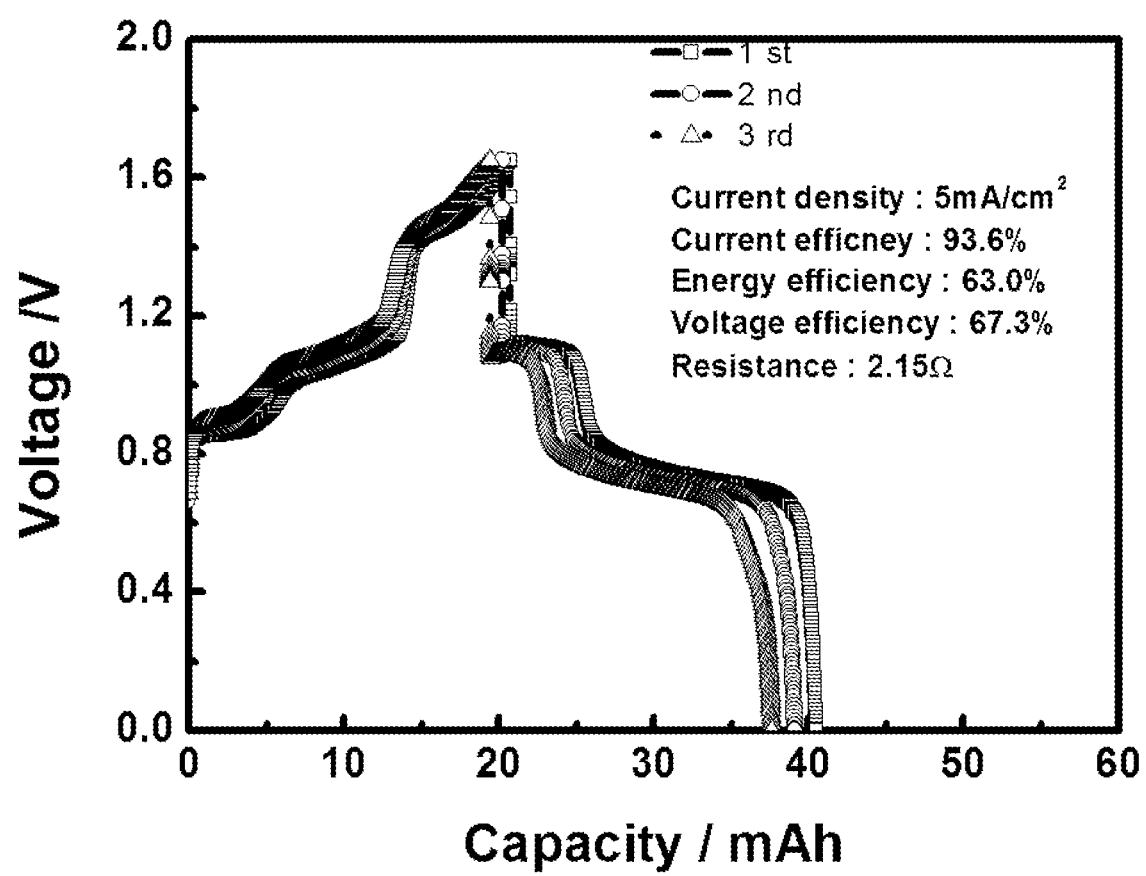
FIG. 8B shows the results of charge/discharge testing of an ethyl viologen diiodide redox flow battery using an FAP-450 separator, including potential changes, current efficiency, energy efficiency and potential efficiency over time at a current density of 5 $mA/cm^2$.
Figure 8C:
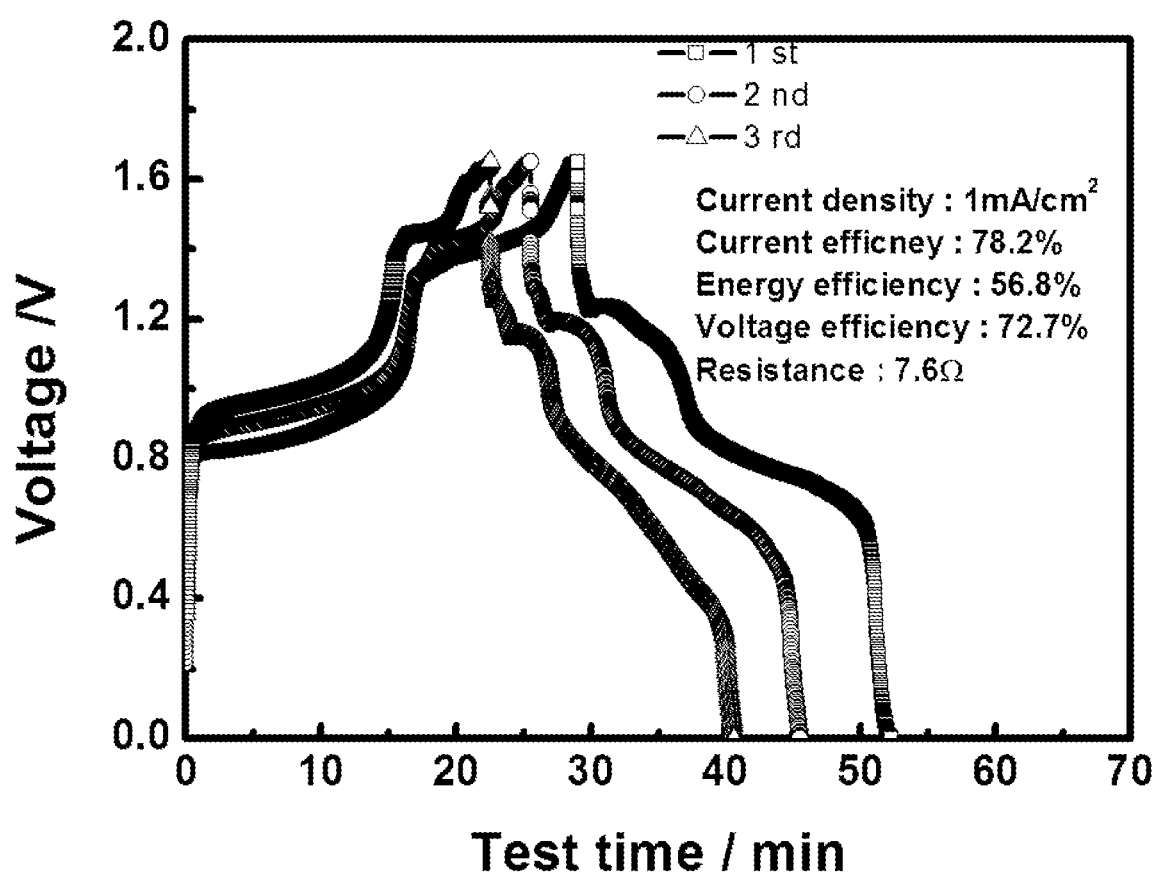
FIG. 8C shows the results of charge/discharge testing of an ethyl viologen diiodide redox flow battery using an FAP-450 separator, including potential changes, current efficiency, energy efficiency and potential efficiency over time at a current density of 1 $mA/cm^2$.
Figure 8D:
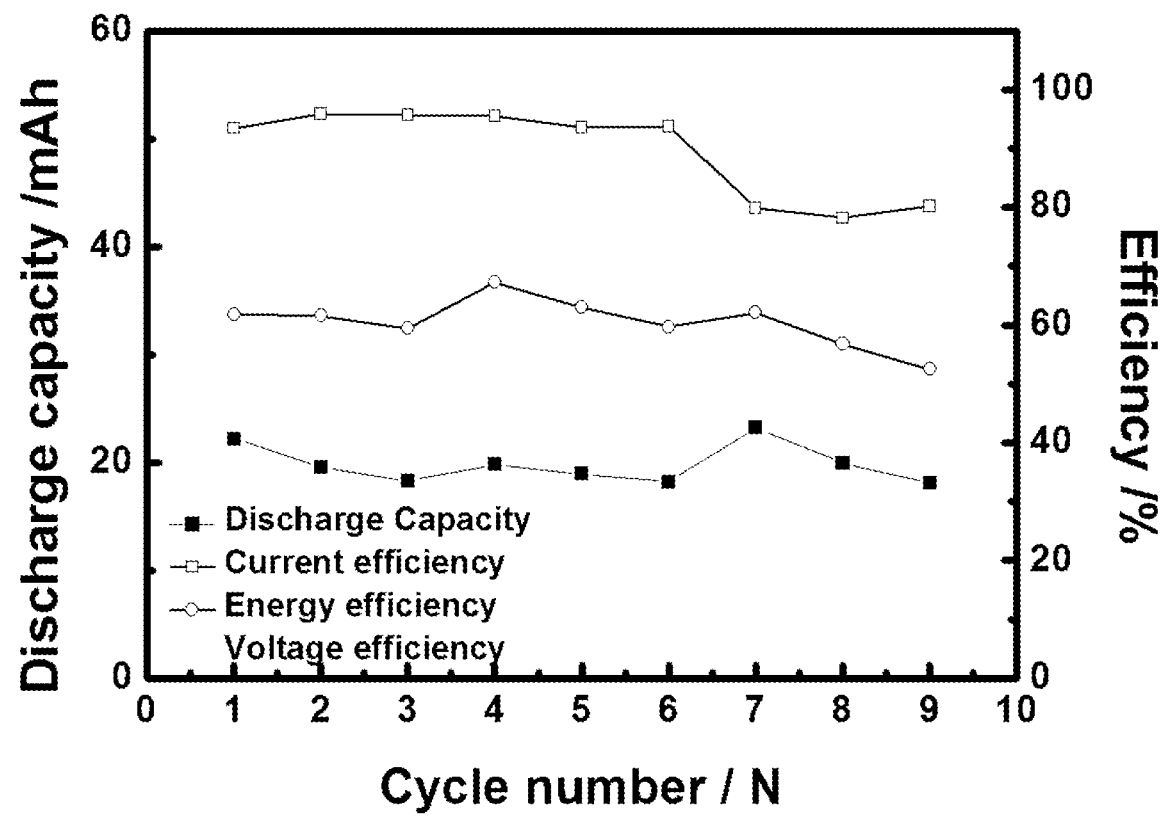
FIG. 8D shows the results of charge/discharge testing of an ethyl viologen diiodide redox flow battery using an FAP-450 separator, including discharge capacity, current efficiency, energy efficiency and potential efficiency depending on the charge/discharge cycles.
Figure 9A:
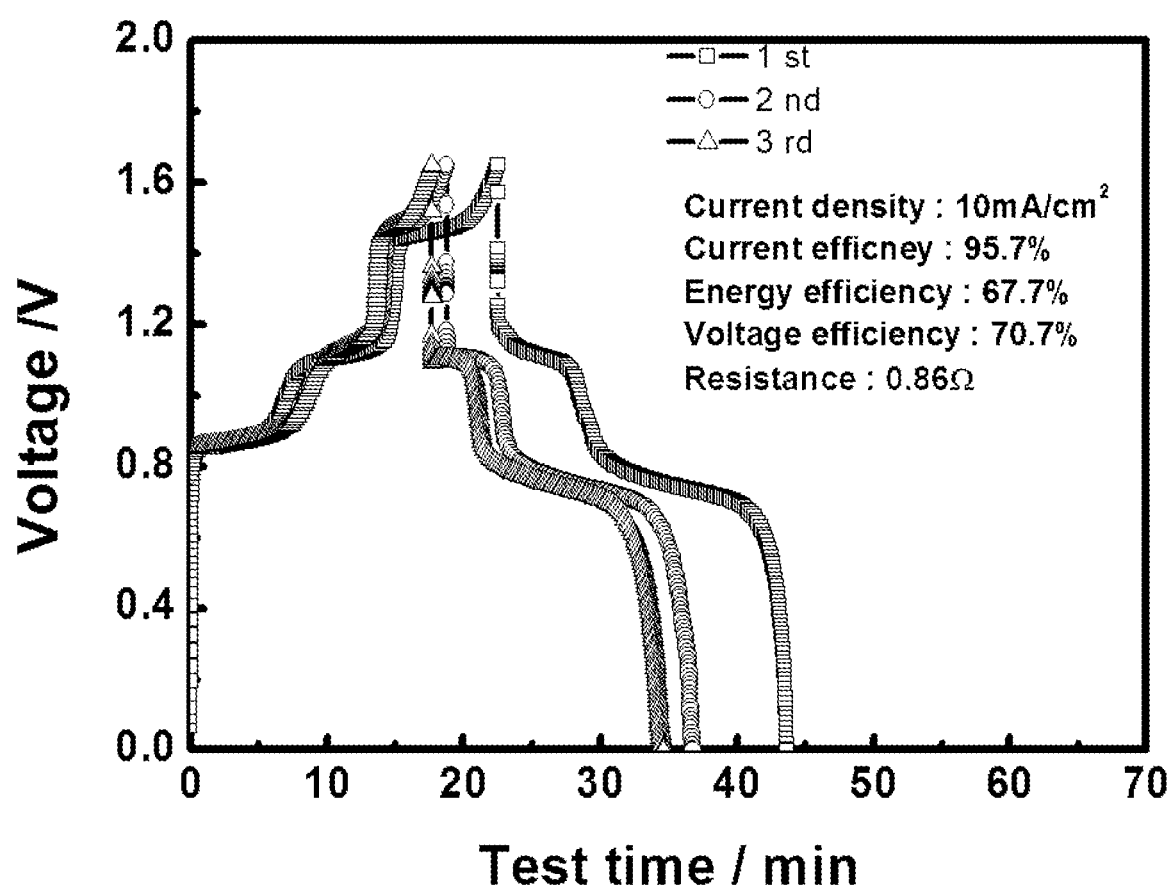
FIG. 9A shows the results of charge/discharge testing of an ethyl viologen diiodide redox flow battery using an FAP-375-PP separator, including potential changes, current efficiency, energy efficiency and potential efficiency over time at a current density of 10 $mA/cm^2$.
Figure 9B:
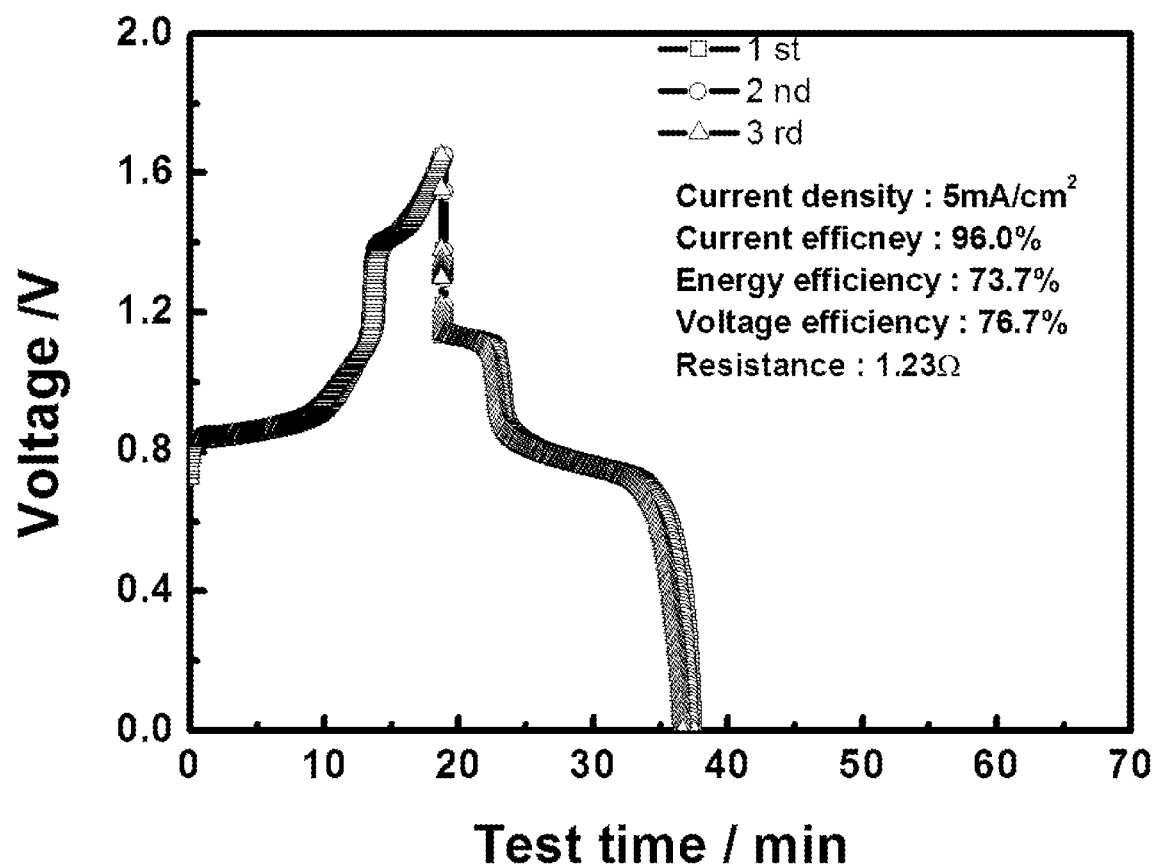
FIG. 9B shows the results of charge/discharge testing of an ethyl viologen diiodide redox flow battery using an FAP-375-PP separator, including potential changes, current efficiency, energy efficiency and potential efficiency over time at a current density of 5 $mA/cm^2$.
Figure 9C:
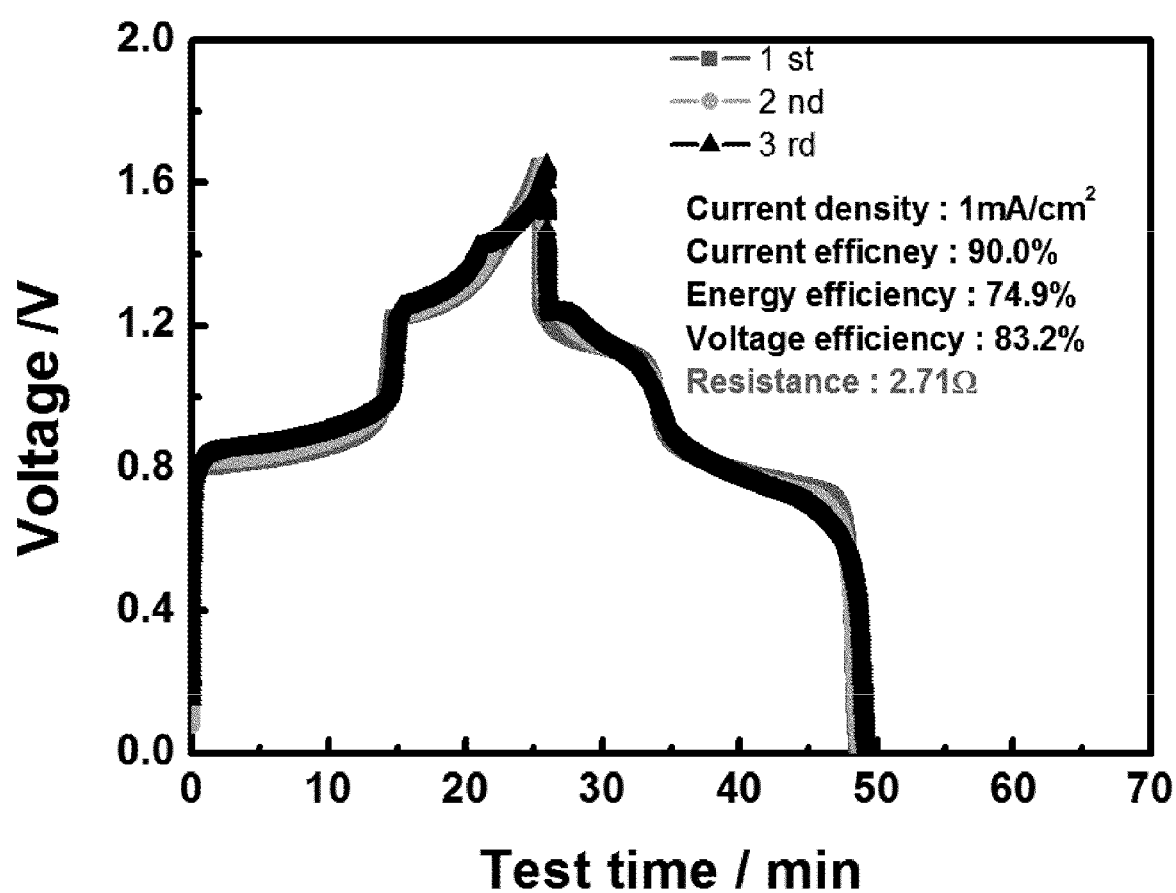
FIG. 9C shows the results of charge/discharge testing of an ethyl viologen diiodide redox flow battery using an FAP-375-PP separator, including potential changes, current efficiency, energy efficiency and potential efficiency over time at a current density of 1 $mA/cm^2$.
Figure 9D:
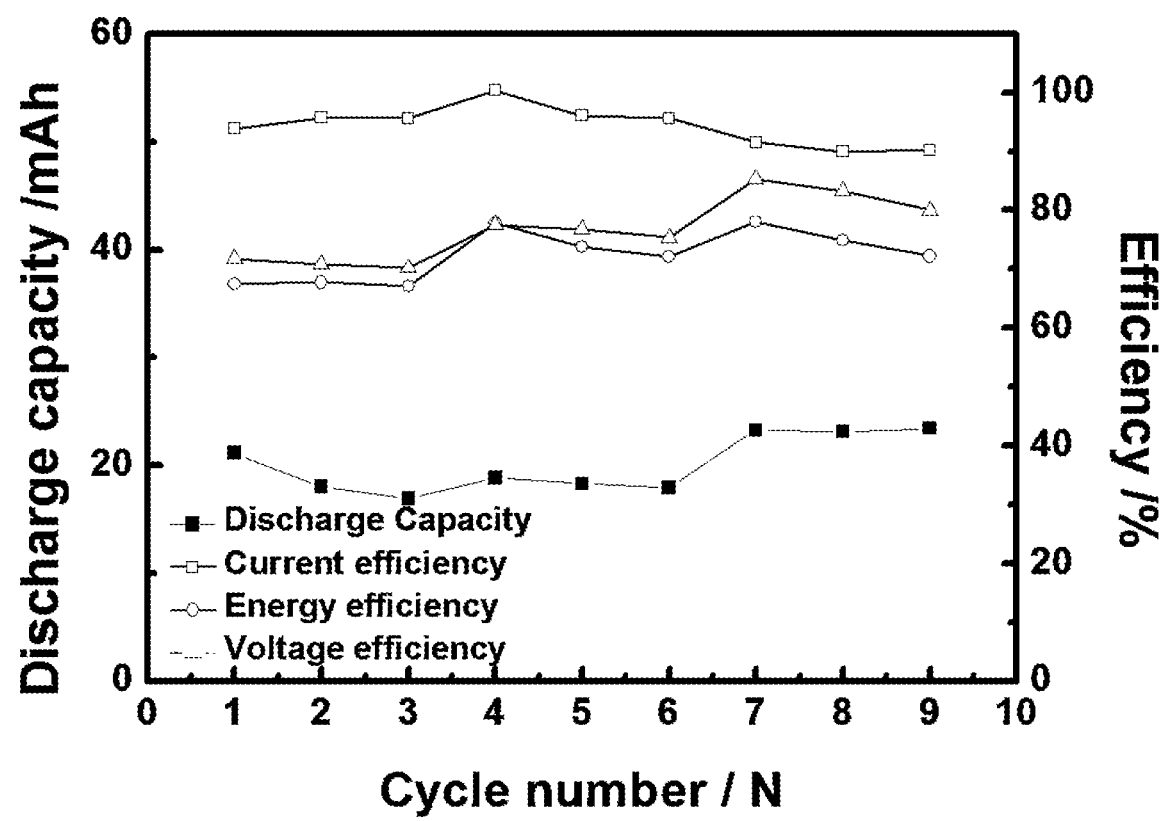
FIG. 9D shows the results of charge/discharge testing of an ethyl viologen diiodide redox flow battery using an FAP-375-PP separator, including discharge capacity, current efficiency, energy efficiency and potential efficiency depending on the charge/discharge cycles.

Test Example 2: Charge/Discharge Testing of Redox Flow Battery 2-1: Charge/Discharge Testing of Ethyl Viologen Diiodide A 0.2 M EVD active material and a 1 M LiCl supporting electrolyte were dissolved in an aqueous solvent to give an electrolyte solution, which was then injected in the same amount of 3 ml into each of a cathode and an anode, after which a redox flow battery was manufactured in the configuration shown in FIG. 7. Here, the electrode used for a cathode cell and an anode cell was a carbon felt electrode having an area of 12 cm² (Toyobo, XF-30A, t=4 mm), and a separator was an anion exchange membrane (Fumatech, FAP-450 (thickness: 50 μm), FAP-375-PP (thickness: 70 μm)). Thereafter, charge/discharge testing of the battery was performed at room temperature (25° C.) using a Maccor 4000, available from Maccor. Here, the charge/discharge voltage fell in the range from 0 V to 1.65 V and the continuous charge/discharge was carried out at a current density of 10, 5, and 1 mA/cm².

Based on the test results, in the battery using the FAP-450 separator, when the current density was 10 mA/cm², the current efficiency was the highest at the level of 96.0%, and the highest energy efficiency of 63.0% was exhibited at 5 mA/cm² and the highest potential efficiency was 72.7% at 1 mA/cm². The discharge capacity did not deviate significantly from about 20 mAh despite an increase in the charge/discharge cycles (FIG. 8).

On the other hand, in the battery using the FAP-375-PP separator, the highest current efficiency of 96.0% was manifested at a current density of 5 mA/cm², and the energy efficiency and the potential efficiency were the highest at the levels of 74.9% and 83.2%, respectively, at 1 mA/cm². The discharge capacity was similar to that of the battery using the FAP-450 separator (FIG. 9).

2-2: Charge/Discharge Testing of Pyrazine-NaI

As in Test Example 1-4, pyrazine underwent a redox reaction at the negative potential, and 0.3 M pyrazine and 2 M NaCl, serving as a supporting electrolyte, were dissolved in a water-soluble solvent and the resulting solution was used as an anode electrolyte solution, and 0.3 M NaI and 2 M NaCl were dissolved in a water-soluble solvent and the resulting solution was used as a cathode electrolyte solution. The prepared electrolyte solutions were injected in amounts of 3 ml into a cathode and an anode, respectively, after which a redox flow battery having the configuration of FIG. 8 was manufactured. Here, the electrode used for a cathode cell and an anode cell was a carbon felt electrode having an area of 12 cm² (Toyobo, XF-30A, t=4 mm), and the separator was a porous Celgard 3501 membrane. Thereafter, charge/discharge testing of the battery was performed at room temperature (25° C.) using Maccor 4000 available from Maccor. Here, the charge/discharge voltage fell in the range from 0.8~1.2 V to 2 V and the continuous charge/discharge was carried out at a current density of 40 mA/cm².

Figure 10:
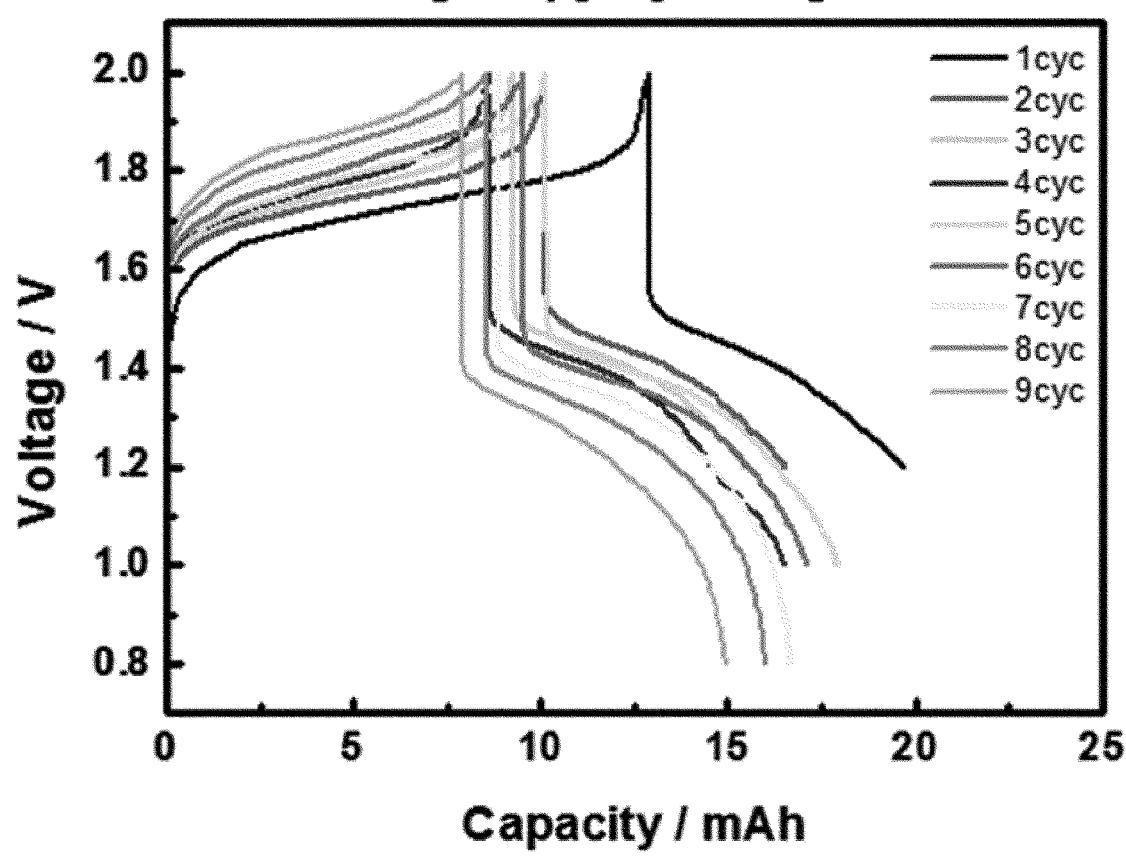
FIG. 10 shows the results of charge/discharge testing of a pyrazine-NaI redox flow battery, including the results of current capacity and potential depending on the charge/discharge cycles.

Based on the test results, as the number of charge/discharge cycles increased, the maximum capacity of the battery was decreased but the maximum potential was maintained at 2.0 V (FIG. 10).

Although specific embodiments of the present invention have been disclosed in detail as described above, it is obvious to those skilled in the art that such description is merely of preferable exemplary embodiments and is not construed to limit the scope of the present invention. Therefore, the substantial scope of the present invention will be defined by the appended claims and equivalents thereof.

The invention claimed is:

1. An electrolyte solution for a redox flow battery, comprising:
    a supporting electrolyte, an aqueous solvent, and an organic active material,
    wherein the organic active material is an alkyl viologen dihalide.

2. The electrolyte solution of claim 1, wherein the organic active material is used as a single active material for a cathode and an anode.

3. The electrolyte solution of claim 1, wherein the alkyl viologen dihalide has an alkyl group selected from the group consisting of ethyl, methyl, propyl, butyl, heptyl, and diheptyl.

4. The electrolyte solution of claim 3, wherein the alkyl viologen dihalide is ethyl viologen diiodide or ethyl viologen diperchlorate.

5. The electrolyte solution of claim 1, wherein the alkyl viologen dihalide is alkyl viologen diiodide or alkyl viologen diperchlorate.

6. The electrolyte solution of claim 1, wherein the organic active material is present in a concentration of 0.005 M to 0.3 M in the electrolyte solution.

7. The electrolyte solution of claim 1, wherein the supporting electrolyte is selected from the group consisting of $H_2SO_4$, $Li_2SO_4$, $Na_2SO_4$, $K_2SO_4$ and LiCl.

8. The electrolyte solution of claim 1, wherein the supporting electrolyte is present in a concentration of 0.5 M to 3 M in the electrolyte solution.

9. A redox flow battery, comprising:
    a cathode cell comprising a cathode and a cathode electrolyte solution;
    an anode cell comprising an anode and an anode electrolyte solution; and
    a separator disposed between the cathode cell and the anode cell,
    wherein the cathode electrolyte solution and the anode electrolyte solution comprise a supporting electrolyte, an aqueous solvent and an organic active material, and the organic active material is an alkyl viologen dihalide.

10. The redox flow battery of claim 9, wherein the separator is an anion exchange membrane or a porous membrane.

* * * * *